(12) United States Patent
Harris et al.

(10) Patent No.: US 10,609,170 B2
(45) Date of Patent: *Mar. 31, 2020

(54) DELIVERING CUSTOMIZED CONTENT TO MOBILE DEVICES

(71) Applicant: ACK Ventures Holdings, LLC, Boca Raton, FL (US)

(72) Inventors: Michelle Harris, New York, NY (US); Harry Kargman, New York, NY (US); Dan Jethanamest, Palisades Park, NJ (US); Thomas Leroux, New York, NY (US); Corey Tripp, New York, NY (US); Peter Delucia, Freehold, NJ (US); Lin Hsu, South Windsor, CT (US); Lee Boyle, Emerson, NJ (US); Dan Liu, Washington Crossing, PA (US); George Yi, New York, NY (US); Rocio Katsanis, Astoria, NY (US); Evan Herbst, Baldwin, NY (US)

(73) Assignee: ACK Ventures Holdings, LLC, Boca Raton, FL (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/650,122

(22) Filed: Jul. 14, 2017

(65) Prior Publication Data

US 2017/0353573 A1 Dec. 7, 2017

Related U.S. Application Data

(63) Continuation of application No. 14/599,081, filed on Jan. 16, 2015, now Pat. No. 9,736,261, which is a
(Continued)

(51) Int. Cl.
*H04L 29/08* (2006.01)
*G06F 16/957* (2019.01)
*H04L 29/06* (2006.01)

(52) U.S. Cl.
CPC ...... *H04L 67/2823* (2013.01); *G06F 16/9577* (2019.01); *H04L 67/02* (2013.01);
(Continued)

(58) Field of Classification Search
CPC ............ G06F 16/9577; H04L 67/2823; H04L 67/2895
(Continued)

(56) References Cited

U.S. PATENT DOCUMENTS 5,727,159 A 3/1998 Kikinis
5,831,609 A 11/1998 London et al.
(Continued)

FOREIGN PATENT DOCUMENTS

JP 2001-306387 A 11/2001

OTHER PUBLICATIONS

Yin, Xinyi, and Wee Sun Lee. "Using link analysis to improve layout on mobile devices." Proceedings of the 13th international conference on World Wide Web. ACM, 2004.pp. 338-344 (Year: 2004).*

(Continued)

*Primary Examiner* — Satish Rampuria
(74) *Attorney, Agent, or Firm* — McCarter & English, LLP; John S. Curran

(57) ABSTRACT

The illustrative embodiment of the present invention provides a platform that enables a content developer to distribute uniform content to multiple types of requesting mobile devices. By authoring content in a generic markup language and using the technologies included in the Mobile Content Framework (MCF), the content developer is able to provide content to multiple types devices without providing different versions of the content. The content may be authored originally in the generic markup language or translated from other languages into the generic markup language by the
(Continued)

MCF. The MCF exploits the capabilities and accommodates the limitations of different types of wireless devices by converting generic markup language content to device-specific content. The MCF interacts with device registries holding records of the device attributes in order to provide the device-specific content. The MCF handles these issues for current mobile devices while also being extensible for future mobile devices.

18 Claims, 4 Drawing Sheets

Related U.S. Application Data continuation of application No. 13/309,169, filed on Dec. 1, 2011, now Pat. No. 8,938,724, which is a continuation of application No. 12/618,066, filed on Nov. 13, 2009, now Pat. No. 8,095,919, which is a continuation of application No. 10/024,432, filed on Dec. 18, 2001, now Pat. No. 7,644,400.

(60) Provisional application No. 60/256,589, filed on Dec. 18, 2000.

(52) U.S. Cl.
CPC .............. *H04L 67/04* (2013.01); *H04L 67/10* (2013.01); *H04L 67/2852* (2013.01); *H04L 67/303* (2013.01); *H04L 67/42* (2013.01); *H04L 69/08* (2013.01); *H04L 69/329* (2013.01); *H04L 67/2895* (2013.01)

(58) Field of Classification Search
USPC .................................. 717/136–161; 709/246
See application file for complete search history.

(56) References Cited

U.S. PATENT DOCUMENTS

| | | | |
|---|---|---|---|
| 5,848,415 A | 12/1998 | Guck | |
| 6,023,714 A | 2/2000 | Hill et al. | |
| 6,083,279 A | 7/2000 | Cuomo et al. | |
| 6,341,372 B1 | 1/2002 | Datig | |
| 6,343,377 B1 | 1/2002 | Gessner et al. | |
| 6,438,575 B1 | 8/2002 | Khan et al. | |
| 6,504,554 B1 | 1/2003 | Stone et al. | |
| 6,691,302 B1 | 2/2004 | Skrzynski et al. | |
| 6,857,102 B1 | 2/2005 | Bickmore et al. | |
| 6,938,087 B1 | 8/2005 | Abu-Samaha | |
| 6,952,181 B2 | 10/2005 | Karr et al. | |
| 6,996,809 B2 | 2/2006 | Muhlestein et al. | |
| 7,428,725 B2 | 9/2008 | Niyogi et al. | |
| 7,644,400 B2 | 1/2010 | Harris et al. | |
| 7,716,281 B2 * | 5/2010 | Lin ....................... | G06F 3/0486 |
| | | | 709/203 |
| 7,853,474 B2 * | 12/2010 | Ullah ..................... | G06Q 30/02 |
| | | | 705/14.4 |
| 8,095,919 B2 | 1/2012 | Harris et al. | |
| 8,938,724 B2 | 1/2015 | Harris et al. | |
| 9,020,528 B2 * | 4/2015 | Hurowitz ................ | H04W 4/02 |
| | | | 455/456.1 |
| 9,736,261 B2 | 8/2017 | Harris et al. | |
| 2001/0039578 A1 | 11/2001 | Tokumaru et al. | |
| 2001/0042043 A1 | 11/2001 | Shear et al. | |
| 2002/0019881 A1 | 2/2002 | Bokhari et al. | |
| 2002/0095663 A1 | 7/2002 | Joory | |
| 2002/0102998 A1 | 8/2002 | Lin | |
| 2002/0103881 A1 | 8/2002 | Granade et al. | |
| 2002/0112078 A1 | 8/2002 | Yach | |
| 2002/0161664 A1 | 10/2002 | Shaya et al. | |
| 2002/0165988 A1 | 11/2002 | Khan et al. | |
| 2003/0035004 A1 | 2/2003 | Dove et al. | |
| 2003/0051073 A1 | 3/2003 | Mishra et al. | |
| 2003/0101438 A1 | 5/2003 | Mishra et al. | |
| 2003/0135845 A1 | 7/2003 | Nunomura | |
| 2004/0015911 A1 | 1/2004 | Hinsley et al. | |
| 2005/0114757 A1 | 5/2005 | Sahota et al. | |
| 2006/0048051 A1 | 3/2006 | Lazaridis | |
| 2007/0100648 A1 * | 5/2007 | Borquez ................... | G06F 8/20 |
| | | | 709/218 |
| 2010/0281042 A1 * | 11/2010 | Windes .............. | H04N 7/17327 |
| | | | 707/756 |

OTHER PUBLICATIONS

Su, Zhou, et al. "A novel design for content delivery over software defined mobile social networks." IEEE Network 29.4 (2015): pp. 62-67. (Year: 2015).*

Saha, Subhasis, Mark Jamtgaard, and John Villasenor. "Bringing the wireless Internet to mobile devices." Computer34.6 (2001): pp. 54-58. (Year: 2001).*

Zhang, Dongsong, and Sanatombi Shijagurumayum. "Personalized content delivery to mobile devices.";SMC'03 Conference Proceedings. 2003 IEEE International Conference on Systems, Man and Cybernetics. Conference Theme-System Security and Assurance (Cat. No. 03CH37483). vol. 3. IEEE, 2003.pp. 2533-2538 (Year: 2003).*

Bila, Nilton, et al. "Pagetailor: reusable end-user customization for the mobile web.";Proceedings of the 5th international conference on Mobile systems, applications and services. 2007.pp. 16-29 (Year: 2007).*

Leung, Chi-Hong, and Yuen-Yan Chan. "Mobile learning: A new paradigm in electronic learning.";Proceedings 3rd IEEE International Conference on Advanced Technologies. IEEE, 2003.pp. 1-5 (Year: 2003).*

Andersson, WAP: Now and Into the Future! retrieved online at http:www.wirelessdevnet.com/channels/wap/features/future_wap12.phtml. pp. 1-5 (2007).

Bickmore et al., Digestor: Device-independent Access to the World Wide Web. Computer Networks and ISDN Systems. 1997;29:1075-1082.

Bonifati et al., Building Multi-device, Content-Centric Applications Using WebML and the W3I3 Tool Suite. ER 2000 Workshop, LNCS. 2000;1921:64-75.

Eisenstein et al., Adapting to Mobile Contexts with User-Interface Modeling. Third IEEE Workshop on Mobile Computing Systems and Applications. pp. 83-92 (2000).

Freytag et al., Resource adaptive WWW access for mobile applications. Computers & Graphics. Dec. 1999;23(6):841-848.

Kay, How to Markup Languages. retrieved online at: https://www.computerworld.com/article/2558597/app-development/markup-languages.html. 4 pages. Aug. 8, 2005.

Lan et al., A Mobile e-Commerce Solution. Proceedings of the International Symposium on Multimedia Software Engineering, IEEE. pp. 215-222 (2000).

Lie et al., Multi-purpose publishing using HTML, XML, and CSS. Magazine Communications of the ACM CACM Homepage Archive. Oct. 1998;42(10):95-101.

LogicaCMG, Volantis Solution Overview. Volantis Mobile Content Framework. pp. 1-11 (2005).

Ma et al., A framework for adaptive content delivery in heterogeneous network environments. SPIE. 2000;3969:15 pages.

Metter et al., WAP enabling existing HTML applications. First Australasian User Interface Conference. AUIC 2000. pp. 19-57. (2000).

Microsoft Computer Dictionary, 5th Edition, Microsoft Press, pp. 328-329 (2002).

Pace et al., A Multi-Technology Location-Aware Wireless System for Interactive Fruition of Multimedia Contents. IEEE Transactions on Consumer Electronics. May 2009;55(2):342-350.

Watson, Brief History of Document Markup. University of Florida, IFAS Extension. 6 pages. (2002).

(56) References Cited

OTHER PUBLICATIONS

European Office Action for Application No. 01985593.1, dated Sep. 26, 2008. 7 pages.

* cited by examiner

DELIVERING CUSTOMIZED CONTENT TO MOBILE DEVICES

RELATED APPLICATION

This application is a continuation of U.S. patent application Ser. No. 14/599,081, now U.S. Pat. No. 9,736,261 filed on Jan. 16, 2015 and entitled "Delivering Customized Content To Mobile Devices", which is a continuation of U.S. patent application Ser. No. 13/309,169, now U.S. Pat. No. 8,938,724, filed on Dec. 1, 2011 and entitled "Delivering Customized Content To Mobile Devices", which is a continuation of U.S. patent application Ser. No. 12/618,066 filed Nov. 13, 2009, now U.S. Pat. No. 8,095,919, and entitled "System and Method for Delivering Content to Mobile Devices", which is a continuation of U.S. patent application Ser. No. 10/024,432 filed on Dec. 18, 2001, now U.S. Pat. No. 7,644,400, and entitled "System and Method for Delivering Content to Mobile Devices" which claimed the benefit of U.S. Provisional Patent Application No. 60/256,589 filed on Dec. 18, 2000. The contents of each and all of the aforementioned applications are hereby incorporated by reference in their entirety.

FIELD OF THE INVENTION

The illustrative embodiment of the present invention relates generally to the delivery of content to mobile devices, and more particularly to the delivery of the same content to multiple mobile devices using different device protocols.

BACKGROUND

Delivering easy to use content to mobile devices today is difficult for the content provider. There are many different mobile devices which have different functions, and many more are expected to surface over the near term. There are many content variables which must be taken into account when delivering content to a mobile device. Enterprises and content providers must deliver the "right" content for each requesting device by taking into account content variables associated with the requesting mobile device. Typically, mobile devices have fewer resources available (compared with a personal computer) with which to render content for a user. Content variables include differences in device languages, device display characteristics, device input methods, character encoding methods, and user preferences. Wireless devices use different types of languages such as WML, HDML, HTML, compact-HTML and Palm webClippings. Additionally, even when two devices employ the same language, there is no guarantee that they each interpret and render content the same way. For example, the way WML is rendered on Nokia devices is very different from the way it is rendered on devices from other manufacturers. Device displays represent another content variable.

There is a large variation in the way content is displayed across different handheld devices. Some displays are long and some are wide. Some browsers can display images and some can not display images. Some displays support color in various depths, some displays support grayscale images, and some displays support only black and white images. Moreover, resolution and legibility vary differently from display size. Content geared for mobile devices must be able to overcome these content variables while delivering relevant content.

Another content variable is the method used by the wireless device for device input. Mobile phones usually only have a numeric keypad, while PDAs have stylus input. Some devices like the RIM Blackberry have a full keyboard while other devices support voice commands. Character encoding represents an addition content variable that content providers must take into account when delivering content to wireless devices. Some devices require content to be delivered using a special character encoding. For example, i-mode phones require content in Shift-JIS encoding in order for Japanese characters to appear correctly. An additional type of content variable is caused by the accommodation of user preferences. User may specify a particular language in which they wish to receive the content, such as French. Alternatively, users may prefer to see only text content in order to speed up content delivery, or prefer to see graphics-rich content on their color PDA display.

Conventional methods used by web site developers to deal with content variables have been inadequate. Typically, web site developers have attempted to provide content to multiple types of wireless devices by providing multiple versions of web sites, stripping down content into a lowest common denominator approach, or by utilizing web scraping technology (explained below) to create content for the requesting wireless device out of content appearing on a regular HTML web site. All of the approaches produce inadequate results. Maintaining multiple versions of a web site for different wireless devices is costly from both a time, human capital and monetary perspective. Presenting only basic content, such as text-only content, on a web site deprives requesting users of full featured wireless devices of features present in their devices. Additionally, the approach will still will not present content that all devices can accept (i.e.: there is no lowest common denominator that works for all devices). Web scraping is a technique by which useful information, either regarding the content, the layout, or the appearance of a web page, is obtained from the page received by the browser rather than using the content source (possibly a JSP or ASP) or an interface link to the application that generated the content. However, HTML content from a standard web site is not readily adaptable for mobile devices, a fact which often results in a translation of HTML content that is often imperfect and difficult to navigate on a requesting mobile device (possibly producing gibberish or unintelligible text).

SUMMARY OF THE INVENTION

The illustrative embodiment of the present invention provides a mobile content framework (MCF) that facilitates abstracting content and behavior from the rendering of content on a requesting device. Content is abstracted in a manner specifically tailored to take into account the limited resources of certain devices such as mobile devices (although the process works for devices not under resource restrictions). The abstraction process allows the distribution of uniform content to multiple types of requesting devices. Content is generated specifically for each device, both from a display standpoint and a content navigation standpoint. The interface may be dynamically personalized to the taste of the individual. The MCF includes a generic markup language, referred to as Wireless Abstract XML (hereafter WAX) that is easily extended and can be translated into a variety of different mobile device markup languages (WAX is referred to as KGML in related provisional 60/256,589). Content is first translated into WAX from the original language of the content provider, or is created in WAX originally, and then converted into a device appropriate language for a requesting mobile device. WAX is designed to enable the content developer to describe content at a more abstract level than that used in individual protocols. The greater level of abstraction enables the subsequent conversion of WAX into the languages used by the requesting mobile devices such as WML, HDML and HTML. Typical markup languages focus on how content is rendered on the device, while WAX focuses on generic but smart objects whose transformation is tailored to specific devices. During this transformation process, the MCF ensures the best type and length of text is used, the best type and size of image is used, and that the content is well suited and customized for the device attributes. The customization process uses device attribute records stored in databases to choose appropriate content for the requesting device.

In one embodiment, an electronic device is interfaced with a content location. The electronic device has access to at least one registry holding device information for multiple mobile devices. The device information includes a programming language used by each type of mobile device. Upon receiving a request for content from a mobile device, the electronic device retrieves device information from at least one registry. The requested content is converted from a generic markup language into device-specific content using the retrieved device information.

In another embodiment, an electronic device is interfaced with a content location. The electronic device has access to multiple registries holding device information for different types of wireless devices. The device information includes a programming language used by each type of wireless device. The content is converted into a generic markup language. Upon receiving a request for content from a wireless device, the electronic device retrieves device information from at least one of the registries. The requested content is converted from the generic markup language into device-specific content using the retrieved device information.

DETAILED DESCRIPTION

The illustrative embodiment of the present invention provides a platform that enables a content developer to build an effective wireless web site. By authoring content in WAX and using the technologies included in the Mobile Content Framework (MCF), the content developer is able to quickly and easily build wireless web applications that target wireless devices. The content may be authored originally in WAX or translated from other languages into WAX by the MCF. The MCF exploits the capabilities and accommodates the limitations of different types of wireless devices by converting WAX content to device-specific content. The MCF handles these issues for current wireless devices while also being extensible for future wireless devices.

Figure 1:
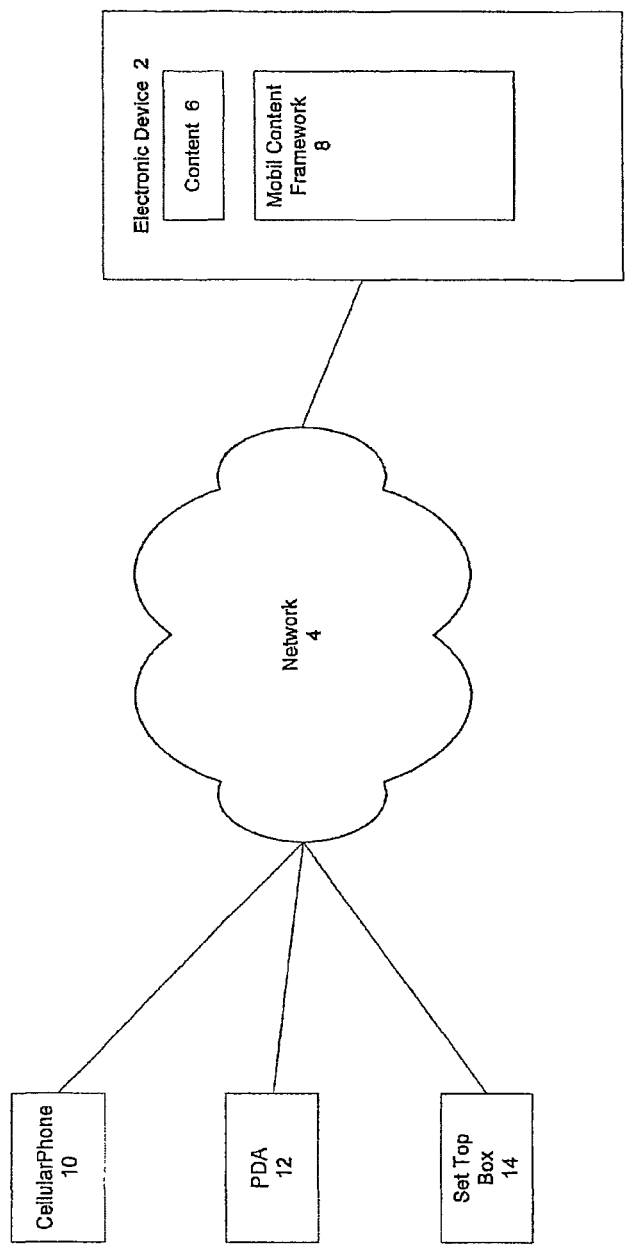
FIG. 1 depicts an environment suitable for practicing an illustrative embodiment of the present invention.

FIG. 1 depicts an environment suitable for practicing the illustrative embodiment of the present invention. An electronic device 2 is interfaced with a network 4. The electronic device 2 includes content 6 and the MCF 8. The content 6 may be content in written in WAX, a non-WAX wireless language format, or a non-wireless language format. Also interfaced with the network 4 are a plurality of mobile devices 10, 12, and 14. The plurality of mobile devices, a cellular phone 10, a PDA 12 and set-top box 14, request the content 6 from the electronic device 2. The mobile devices may be cellular phones, PDAs, cable TV or satellite TV set-top boxes, and other similar devices with limited resources including stationary devices (i.e.: a wired set-top box). Although the term wireless device is used herein interchangeably with the term mobile device, those skilled in the art will realize that both wireless and wired devices are within the scope of present invention and examples using the term wireless are intended as illustrative embodiments. The MCF 8 translates the content 6 into WAX if the content is in a non-WAX format and then converts the content so that it is appropriate for the requesting wireless device 10,12 and 14 from both a language and device attribute perspective.

The MCF 8 uses its own brand of markup language known as Wireless Abstract XML (WAX) with which to describe content. This language is geared exclusively to mobile devices, and combines features of the most common markup languages like WML, HDML and HTML. WAX is designed at a level above other content markup languages such as WML, HDML and HTML. WAX focuses on "logical widgets" that are translated to device-specific content. WAX is designed to overcome the challenges of graphics and user-input on small devices. For example, a good paradigm for delivering content on mobile phones is a "9-grid" format. On a mobile phone, a graphic may be displayed and broken up into 9 segments (like a tic-tac-toe board), with each number on the keypad of the mobile phone acting as an input link to each segment of the grid. This paradigm works well when navigating and zooming maps. This paradigm, however, does not hold true with PDAs since they do not have numeric keypads. Instead, a PDA displays the "9-grid" using a set of anchored images that can be clicked on using the PDA's stylus.

WAX has been developed such that it is "device-smart" in that it detects the idiosyncrasies of each device. For example, the WAP browser on Nokia's phones does not display lists in the same fashion as the browsers on phones from other manufacturers. In addition to running different software protocols, some devices which are running the same software may be running different software versions. Some devices have two programmable "soft-keys", while others have one. WAX adjusts to the limitations and features of each device. WAX is also extensible so that as new devices becomes available, new translation sheets can be added easily. For example, if a new device supports a brand-new markup language, a translator for this new device can be added seamlessly, without changing any piece of the core WAX architecture.

The WAX language may be dynamically translated to a requesting device's native language. The MCF 8 dynamically translates WAX into other markup languages using XML-based technologies. Content is translated from WAX to languages like WML, HDML and HTML. The content is not only translated into a specific language appropriate for the device, but also (unlike traditional XSL stylesheets) is tailored based upon the attributes of the requesting device. The attributes may involve device features, memory, storage capacity, communication speed, type of operating system, and other attributes related to the device. Some devices require their own special translation rules. For example, a WAX "Date-Chooser" renders one way on the limited screen sizes of mobile phones (possibly through a series of WML decks and another way on a PDA (all on one screen). WAX tags that are attached to content operate at a higher level of abstraction than prior standard wireless markup languages. The WAX language is easily extensible since new tags can be added by the content developer. The developer can specialize the behavior of any WAX tag (new and old by updating or adding to the translation rules. Many systems can generate WAX. WAX can originate from Java Server Pages, Active Server Pages, Perl, PHP, or many other web content management packages. In one embodiment, the attributes used to generate content include carrier attributes as well as device attributes.

The MCF 8 utilizes the WAX language to help tailor content to specific requesting devices. Content is translated from WAX into a device-specific language and is also tailored to take advantage of features and accommodate limitations in the requesting device. The MCF 8 includes registries listing device capabilities which are utilized to provide appropriate amounts and types of content to the requesting device.

Figure 2:
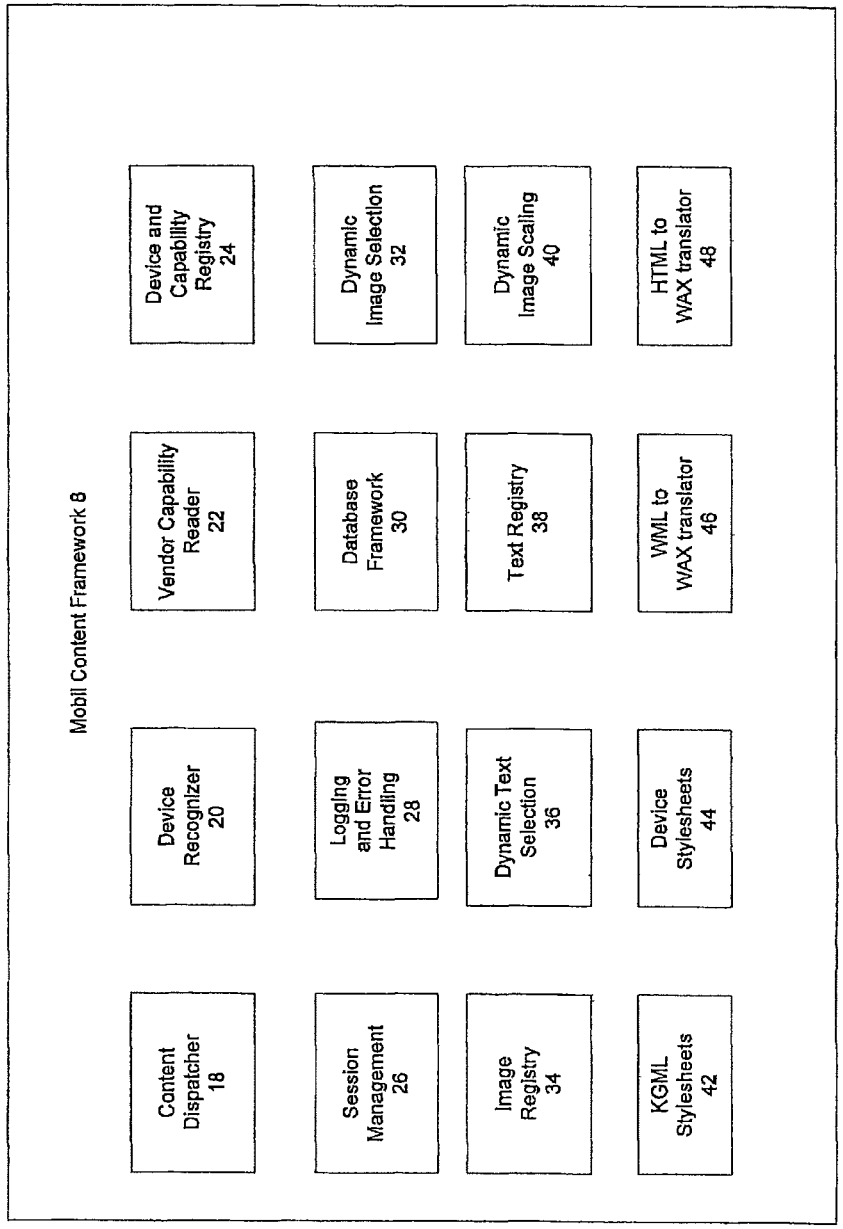
FIG. 2 depicts a block diagram of components included in the Mobile Content Framework (MCF)

FIG. 2 depicts a block diagram of components included in the Mobile Content Framework 8. The MCF 8 includes a content dispatcher 18, device recognizer 20, a vendor capability reader 22, and a device and capability registry 24. The content dispatcher 18 queries web technology tools such as PHP, Cold Fusion, Perl CGI, Vignette, Microsoft Active Server Pages, and Java Server Pages to generate a form of WAX most suitable for the requesting device. The MCF 8 also includes a session management component 26, a logging and error handling component 28 and a database framework component 30. The session management component 26 provides automated session handling. The automated session handling uses cookies (if the device supports them), or operates transparently using URL rewriting if the device does not support cookies. Session handling, including URL rewriting, is automatic, which minimizes the amount of development effort required. The logging and error handling component 28 logs application messages. The application messages may have levels to specify debug, informational, warning and error conditions and are important for developing and debugging large scale wireless web sites. The database framework component 30 includes connection pooling. Database parameters are kept in a properties file to ease deployment from development to test to production.

All mobile devices and their capabilities are kept in a device and capability registry 24. The device and capability registry 24 is an XML file, and allows the content developer to group devices together, while also keeping track of the specific features of each device. The device and capability registry 24 also contains a set of rules used to determine which device is connecting to the MCF 8. These rules are important since all mobile devices identify themselves differently. Once the type of device is identified, attributes such as screen size, color depth, browser version and type, and translation rules become known. Changes can be made to the device and capability registry 24 on an application-specific basis. If changes are made to the device and capability registry 24 on an application-specific basis, the system allows the content developer to receive automatic updates of the device registry for new devices from a central source while maintaining a separate registry for application-specific device groupings and capabilities.

The MCF 8 also includes a dynamic image selection component 32, an image registry 34, a dynamic text selection component 36, a text registry 38, a dynamic image scaling component 40. The dynamic image selection component 32 uses the image registry 34, and the dynamic text selection component 36 uses the text registry 38 to determine the best content to deliver to a requesting device at any given time. The process of dynamic image selection is discussed in more detail below. The dynamic image scaling component 40 allows a content developer to provide only a small set of images during design time, while also having the framework generate images that are displayed correctly on each device. The image-scaling framework scales and crops images to the right size and translates between image formats. The image scaling component also caches generated images to avoid translating an image more than once and pre-generates images to allow content developers to see all images before they are served to a requesting device. Additionally, the MCF 8 includes a WAX stylesheets component 42, a device stylesheets component 44, a WML to WAX translator component 46, and an HTML to WAX translator component 48. The WAX stylesheets component 42 dictates the presentation of the WAX content, and the device stylesheets component 40 tailors the presentation of the content to the requesting device based on the attributes possessed by the requesting device. The WML to WAX translator component 46 and the HTML to WAX translator component 48 translate content in WML or HTML respectively into the WAX format.

The MCF 8 uses a number of different technologies to perform its work including Java and Java Servlets and XML and XSL. The choice of web server depends upon the Servlet engine being used. An example of an implementation scenario is the Apache Web Server with Apache Tomcat Servlet engine on Linux. The web server and servlet engine do not need to be the source for web content. The Extensible Markup Language (XML) is used to author WAX, and the Extensible Stylesheet Language (XSL) is used to author the rules that translate WAX to device-specific languages. The XML and XSL technologies are open standards. An example MCF 8 implementation uses The Apache Software Foundation XML Parser (Xerces) and XSL Processor (Xalan).

Figure 3:
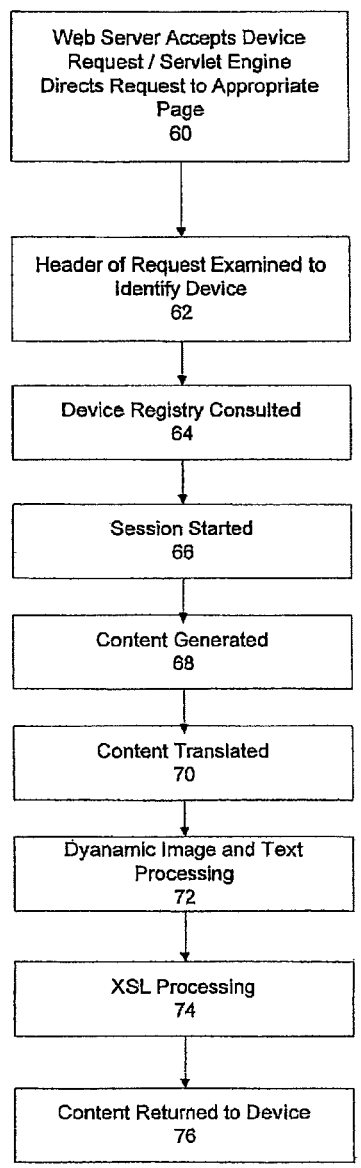
FIG. 3 is a flow chart of the sequence of steps performed by the Mobile Content Framework to process a content request.

The process by which the illustrative embodiment of the present invention provides customized content to requesting mobile devices is depicted in FIG. 3. The process begins when an electronic device, such as a web server accepts a connection and an HTTP request from a mobile device and the servlet engine directs the request to the appropriate page or servlet destined to generate WAX (step 60). In one embodiment, the servlet engine supports the Java Servlet 2.2 specification. The headers of the HTTP request are examined by the MCF 8 in order to determine the type of device and a suitable XSL stylesheet to use for later device-specific translation (step 62). An XML registry of devices is consulted to determine device capabilities (screen size, browser version, etc.) (step 64). A session is started to minimize subsequent processing, and serve as a temporary place for applications to store transient information (step 66). Following the beginning of the session, WAX content is generated (step 68). Business rules, database queries, personalization engines, and other systems can be leveraged to build dynamic content for the end user. WAX can be generated on the fly by a Java Servlet, a Java Server Page, or any other system which can generate dynamic content, such as PHP, Perl CGI, or other 3rd party content management package. WAX may also be generated from other sources outside of MCF. External databases may be queried using JDBC, and the built-in database framework and connection pooling classes may be leveraged to generate WAX. As part of the WAX content generation process, interfaces into existing authentication and authorization systems may be programmed. The MCF 8 includes a client API to interact directly with a personalization service so that user preferences may be extracted from a global shared repository, as well as an API to communicate with a Location Based Services framework. Once all the content generation processing is complete, the resulting WAX is fed into the content translation system where the WAX content is translated (step 70). Dynamic Image and Text Processing is performed (step 72) along with XSL processing (step 74). The WAX stream is examined in order to substitute the most appropriate image with regards to the device, and user preferences. User preferences may include interface choices, key mappings, key behavior, functionality, the amount of information to be rendered, language and location. WAX is translated into a language the requesting device can understand. The stylesheet determined earlier (step 62) is used to perform the translation. The customized content is then returned to requesting device (step 76).

The WAX content may originate either directly from a WAX source, or the WAX content may be dynamically translated from a non-WAX source. In one embodiment, Java Servlets are used to perform the translation although content may be generated using many different types of web technology. Since WAX uses XML documents, tools like PHP, Cold Fusion, Perl CGI, Vignette, Microsoft Active Server Pages, and Java Server Pages may be utilized to generate dynamic WAX. The MCF dispatcher 18 will automatically query these services, and translate the content to a form best suited to the requesting device. Content may be written in HTML and dynamically converted first from HTML to WAX, and then to a language best suited to requesting device, without changing the source HTML. Similarly, content developers may generate content using XML, and then provide XSL stylesheets to translate the XML into any markup language. The ability to translate XML documents is useful in cases where dynamic XML content is obtained from a database, or third-party source, and needs to be rendered into WAX, or any other XML variant.

Figure 4:
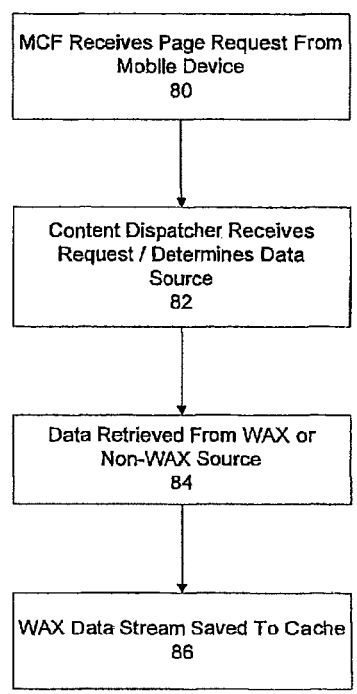
FIG. 4 is a flow chart of the generation of content.

FIG. 4 is a flowchart of the steps used to illustrate how content can originate from different sources, and be dynamically translated by the MCF 8. The process begins when the MCF receives a page request from a wireless device (step 80). The framework determines the type of device with which it is communicating, and initiate a session. The content dispatcher 18 receives the request, and determines from where to obtain the data (step 82). The content dispatcher 18 can choose to serve the page from a cache or obtain the page again from the data source. The appropriate data source is contacted, and the resulting stream of data is obtained (step 84). This data can be WAX, or any XML file. It may be plain HTML. The data source can be web site, a static file, a Servlet or a Java Server Page. Once the data is obtained, it is processed through a variety of filters and translation rules to retrieve the end-result content. Once the content is generated, the resulting stream is saved to cache (if appropriate) so subsequent requests will be processed instantaneously (step 86).

The illustrative embodiment of the present invention addresses one of the biggest problems with translating content dynamically, the performance penalty paid during each web page request. The MCF 8 provides multiple stages at which to cache completed page requests in order to improve the performance of subsequent requests. The page cache works at two different stages, a post-process cache and a post-translate cache. The post-process cache takes place after an application retrieves dynamic data from the database, user-preference system, or anywhere else, when the WAX page is persisted to disk. Subsequent requests for the same page do not require expensive system calls. Since post-process caching is performed before the device-specific translation, it is good for pages whose contents change fairly infrequently, and are not user or device dependent. For example, a page that is rendered from a fairly timely database call can be cached before filtering and translation. The post-translate cache occurs after the WAX has been processed, when the framework translates the WAX into a device-specific markup language (WML, HTML, etc.). Following the translation, the page is persisted to disk and subsequent requests for the same page do not require processing. This form of caching is good for highly customized pages that are directly targeted to a user and/or a device. The illustrative embodiment of the present invention allows the content developer to exercise complete control over how a document is cached, and how long the page remains in cache.

The MCF 8 is extendable and scalable. The content developer can configure and add to the framework in a number of areas. Tags can be added and removed from the WAX language. A new tag can be a composite of existing tags, or it can represent an entirely new idea. Content filters can be inserted to add new functionality, or address special characteristics of new types of devices (special character encodings, scripting languages, etc.). As new devices become available, the content developer can freely add these new devices to the registry, as well as rules to recognize those devices. Alternatively, a subscription plan can ensure that an enterprise always obtains the most recent version of the device file. Database classes may be added which allow many different options for pooling database connections in order to perform fast database access.

Samples of WAX which illustrate some of the basic features are listed below:

```
<?xml version=" 1. 0" encoding="utf-8"?>
<wax:wax xmlns:wax="http://www.kargo.com/wax" version="O.9">
   <wax:doc version="1.0">
      <wax:title>NY Nightlife</wax:title>
      <wax:block id="splash">
         <! --EXAMPLE 1 -->
         <wax : button href="index?a=rnain"
         keytype="accept" type="go" labelid="enter" />
         <wax:p align="center">
            <! --EXAMPLE 2 -->
               <wax: img srcid="logo" alt="My Nightlife"
                  border="O" />
               <wax:br/>
            <! --EXAMPLE 3 -->
            <wax: text id="welcome" />
            <! --EXAMPLE 4 -->
            <% if ((String)session.getAttribute("lang") = =
               null)
            out .println ("<wax:a
            href=\ "index?a=chlang\ ">Choose Language</wax:a>");
            %>
            <wax:br/>
            <wax:br/>
         </wax:p>
      </wax:block>
   </wax:doc>
</wax:wax>
```

Example 1 shows the abstract nature of WAX. The <wax: button> element is displayed as a "soft-key" for WAP devices, but as a "link" for devices which understand only HTML. Examples 2 and 3 illustrate WAX's Dynamic Item Processing feature. In Example 1 the text "logo" is placed into the srcid attribute instead of the URL to the actual image. The text "logo" is used to index into a set of rules to determine the best image to display for the specific device. For example, the framework may determine that "logo.gif" is the best image for the given device or possibly that "logo-nok7100.wbmp" is the best image. WAX itself does not determine the "physical image" to display, only the "logical" image. Example 3 illustrates the same principal, but with text. The id "welcome" may be translated to "Bonjour" for users who specify French as their preferred language or possibly "Welcome to our site, please take a look around!" for wireless devices, having a larger display. Example 4 shows how Java code may be inserted directly into the WAX. In this case, a Java Server Page renders the WAX content, although WAX can be generated by many different web technologies like ASP or Perl CGI.

Information is passed into the framework via an HTTP request from the mobile gateway. Some gateways identify the device and provide their own set of device capabilities, some gateways identify the device but do not provide capabilities, some gateways identify the "family" of the device, and others provide no identification. The MCF 8 retrieves any identifying information, processes it against a set of device-identification rules, and then informs the rest of the framework about the device.

One of the most challenging aspects of delivering content to mobile devices is delivering the right format of content. Some phones only support i-bit BMP images, some PDAs support GIFs, and many browsers do not support images all. The same problem arises when providing text to a mobile device. Some screens are large and some are small. For example, it may be best to limit the size of a restaurant review to one sentence when communicating with a mobile phone, but one paragraph may be more appropriate when communicating with a PDA with much larger screen. The MCF 8 moves the decision as to which image or text element to display out of WAX, and into resource registries. The framework uses the registries to decide what is the best content to deliver to a device at any given time. The process of dynamically deciding what content to deliver is known as "Dynamic Item Selection", and is used for both image and text selection.

WAX is marked up with "logical" image and text identifiers. The processor looks up the "logical" identifier in the appropriate image or text registry, and processes rules to determine which is the best "physical" item. The WAX stream is filtered on the fly to represent the "physical" item. Rules can be placed into the registry to deliver content based on many different variables such as the actual type of device, a device's group (devices can be placed into many different groups, such as "big browser" or "color browser", or "PDA"), and the user's preferred language (for serving different language pages without having to modify the page content). Built-in filename conventions allow images to be served to specific devices, and groups of devices, by naming the file in a certain way. Alternatively, if naming conventions are not followed, specific rules can be added to the image registry to associate an image with a device.

Once a WAX stream has been generated, it is fed into the translation engine. First, the stream of WAX enters into a set of filters that alter many of the "logical" tags into "physical" tags. Then, WAX content is translated using any number of translation sheets. The stream can then be filtered through another level of processing in order to accommodate device requirements such as character encoding.

The MCF 8 includes support for web-scraping technology. This allows content to be authored in HTML, translated to WAX, and then transformed into content best suited for the requesting device. Both translations occur without changing the originating HTML source. Since web-scraping goes through two separate translation steps, the process is always slower than authoring in WAX alone. However, web-scraping does serve a purpose: content developers can (a) easily and quickly get an existing HTML site onto the wireless web, and (b) it provides a learning bridge for building robust and full-featured applications using just WAX. In this model, content is still authored in WAX, however the WAX is embedded with rules that determine where in the HTML document to obtain dynamic content. In one embodiment, an automated testing environment will make sure content will displays correctly before they are deployed to a device. In another embodiment, smart agents are used to gather and transform content for a user at sign-on (i.e.: web-scraping based on device/user profiles).

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrated flowcharts are examples and not the exclusive sequence of steps possible within the scope of the present invention.

We claim:

1. A computer-implemented method of improving the delivery of content over a network to mobile devices, the method comprising:

creating or receiving content in a markup language that includes tags used to translate the content wherein a behavior of the tags is extensible based on an identified attribute of a mobile device and a translation rule, the content in the markup language convertible into content appropriate for display on a plurality of types of mobile devices;

providing a set of rules for translating content from the markup language into content displayable on the plurality of types of mobile devices;

receiving a request for the content from a requesting mobile device over the network;

identifying, automatically without user input, based on the request, a type of device for the requesting mobile device;

retrieving device information for the identified type of device, the device information including data rendering attributes of the requesting mobile device;

generating content for the requesting mobile device by:
converting the content from the markup language into a form of content supported by the requesting mobile device using at least one translation rule from the set of rules, and customizing the converted content based upon at least one device attribute in the device information, the customizing occurring programmatically without input from a user; and transmitting the generated content over the network to the requesting mobile device.

2. The method of claim 1, further comprising:

translating the content from an original programming language into the markup language prior to converting the content in the markup language into content displayable on the requesting mobile device.

3. The method of claim 2, further comprising:
providing a translator capable of converting Wireless Markup Language (WML) content into the markup language content; and
translating WML formatted content into the markup language content using the WML translator.

4. The method of claim 2, further comprising:
providing a translator capable of converting Hypertext Markup Language (HTML) content into the markup language content; and
translating HTML formatted content into the markup language content using the HTML translator.

5. The method of claim 2, further comprising:
marking the markup language content with identifiers; and
performing the retrieving of device information based on one of the identifiers marking the content.

6. The method of claim 1, further comprising:
receiving at least one user preference relating to the display of content on the requesting mobile device; and
using the at least one user preference to customize the content for the requesting mobile device.

7. The method of claim 6 wherein the at least one user preference is at least one of a user interface choice, key mapping, key behavior, functionality, amount of information to be rendered, language, and location.

8. The method of claim 1, further comprising:
providing a plurality of stylesheets for the markup language; and
using the stylesheets in generating the content for the requesting mobile device.

9. The method of claim 1 wherein the requesting mobile device is a cellular phone.

10. A non-transitory medium holding computer-executable instructions for improving the delivery of content over a network to mobile devices, the instructions when executed causing at least one computing device to:
create or receive content in a markup language that includes tags used to translate the content wherein a behavior of the tags is extensible based on an identified attribute of a mobile device and a translation rule, the content in the markup language convertible into content appropriate for display on a plurality of types of mobile devices;
provide a set of rules for translating content from the markup language into content displayable on the plurality of types of mobile devices;
receive a request for the content from a requesting mobile device over the network;
identify, automatically without user input, based on the request, a type of device for the requesting mobile device;
retrieve device information for the identified type of device, the device information including data rendering attributes of the requesting mobile device;
generate content for the mobile device by:
converting the content from the markup language into a form of content supported by the requesting mobile device using at least one translation rule from the set of rules, and
customizing the converted content based upon at least one device attribute in the device information, the customizing occurring programmatically without input from a user; and
transmit the generated content over the network to the requesting mobile device.

11. The medium of claim 10 wherein the instructions when executed further cause the at least one computing device to:
translate the content from an original programming language into the markup language prior to converting the content in the markup language into content displayable on the requesting mobile device.

12. The medium of claim 11 wherein the instructions when executed further cause the at least one computing device to:
provide a translator capable of converting Wireless Markup Language (WML) content into the markup language content; and
translate WML formatted content into the markup language content using the WML translator.

13. The medium of claim 11 wherein the instructions when executed further cause the at least one computing device to:
provide a translator capable of converting Hypertext Markup Language (HTML) content into the markup language content; and
translate HTML formatted content into the markup language content using the HTML translator.

14. The medium of claim 10 wherein the instructions when executed further cause the at least one computing device to:
mark the markup language content with identifiers; and
perform the retrieving of device information based on one of the identifiers marking the content.

15. The medium of claim 10 wherein the instructions when executed further cause the at least one computing device to:
receive at least one user preference relating to the display of content on the requesting mobile device; and
use at least one user preference to customize the content for the requesting mobile device.

16. The medium of claim 15 wherein the at least one user preference is at least one of a user interface choice, key mapping, key behavior, functionality, amount of information to be rendered, language, and location.

17. The medium of claim 10 wherein the instructions when executed further cause the at least one computing device to:
provide a plurality of stylesheets for the markup language; and
use the stylesheets in generating the content for the requesting mobile device.

18. A system for improving the delivery of content over a network to mobile devices, comprising:
a storage location holding content; and
a computing device configured to:
create or receive content in a markup language that includes tags used to translate the content wherein a behavior of the tags is extensible based on an identified attribute of a mobile device and a translation rule, the content in the markup language convertible into content appropriate for display on a plurality of types of mobile devices;
provide a set of rules for translating content from the markup language into content displayable on the plurality of types of mobile devices;
receive a request for the content from the requesting mobile device over the network;
identify, automatically without user input, based on the request, a type of device for the requesting mobile device;

retrieve device information for the identified type of device, the device information including data rendering attributes of the requesting mobile device; and generate content for the mobile device by:
converting the content from the markup language into a form of content supported by the requesting mobile device using at least one translation rule from the set of rules, and customizing the converted content based upon at least one device attribute in the device information, the customizing occurring programmatically without input from a user; and transmitting the generated content over the network to the requesting mobile device.

* * * * *